United States Patent [19]

Nasu

[11] Patent Number: 5,352,078
[45] Date of Patent: Oct. 4, 1994

[54] APPARATUS FOR ATTACHING ELEMENTS TO AN AIRPLANE STRINGER

[75] Inventor: Keyle H. Nasu, Bellevue, Wash.

[73] Assignee: The Boeing Company, Seattle, Wash.

[21] Appl. No.: 986,305

[22] Filed: Dec. 7, 1992

Related U.S. Application Data

[62] Division of Ser. No. 825,487, Jan. 24, 1992, abandoned.

[51] Int. Cl.$^5$ ............................................. F16B 21/00
[52] U.S. Cl. ..................... 411/337; 411/366; 248/228; 403/343
[58] Field of Search ............... 411/432, 166, 169, 174, 411/172, 366, 81, 548, 337; 248/316.6, 72, 228; 403/256, 258, 343, 396, 338, 384; 24/514, 569, 545

[56] References Cited

U.S. PATENT DOCUMENTS

| | | | |
|---|---|---|---|
| 1,343,930 | 6/1920 | Neely | 248/72 |
| 1,631,355 | 6/1927 | Baldwin | 248/316.6 |
| 1,840,216 | 1/1932 | Tormo | 248/72 |
| 2,455,141 | 11/1948 | Runge | 248/316.6 X |
| 2,609,582 | 9/1952 | Kindorf et al. | 248/72 |
| 3,267,631 | 8/1966 | Hammitt | 411/337 X |
| 3,301,513 | 1/1967 | Sugaya | 248/228 X |
| 3,468,509 | 9/1969 | Foltz | 248/316.6 |
| 4,771,973 | 9/1988 | Kohlman et al. | 248/316.6 X |
| 4,896,851 | 1/1990 | Shaull | 248/228 X |
| 5,039,048 | 8/1991 | Paxton | 248/316.6 X |
| 5,067,863 | 11/1991 | Kowalski | 411/432 X |
| 5,176,462 | 1/1993 | Chen | 403/256 X |

FOREIGN PATENT DOCUMENTS

| | | | |
|---|---|---|---|
| 932167 | 3/1948 | France | 403/257 |
| 2089881 | 6/1982 | United Kingdom | 403/DIG. 9 |

*Primary Examiner*—Rodney M. Lindsey
*Attorney, Agent, or Firm*—R. H. Sproule

[57] ABSTRACT

A clip for an airplane stringer supports wires, conduits and the like which are located in the fuselage. The clip has several embodiments for attachment to S-shaped or Z-shaped stringers. Those embodiments of the clip which are attached to S-shaped stringers each have a left end which fits over and around one end of the stringer, and a right end which includes a slot for receiving therein the opposite end of the stringer. The width of the slot is controlled by various mechanisms. The stringer end is retained inside the slot by a ledge or lip portion of the clip which lies over the stringer above the slot. The embodiment of the clip which is attached to Z-shaped stringers includes an upper element which is connected to a separate lower element by a bolt. The upper and lower elements fit about one end of the stringer in an interference fit.

9 Claims, 5 Drawing Sheets

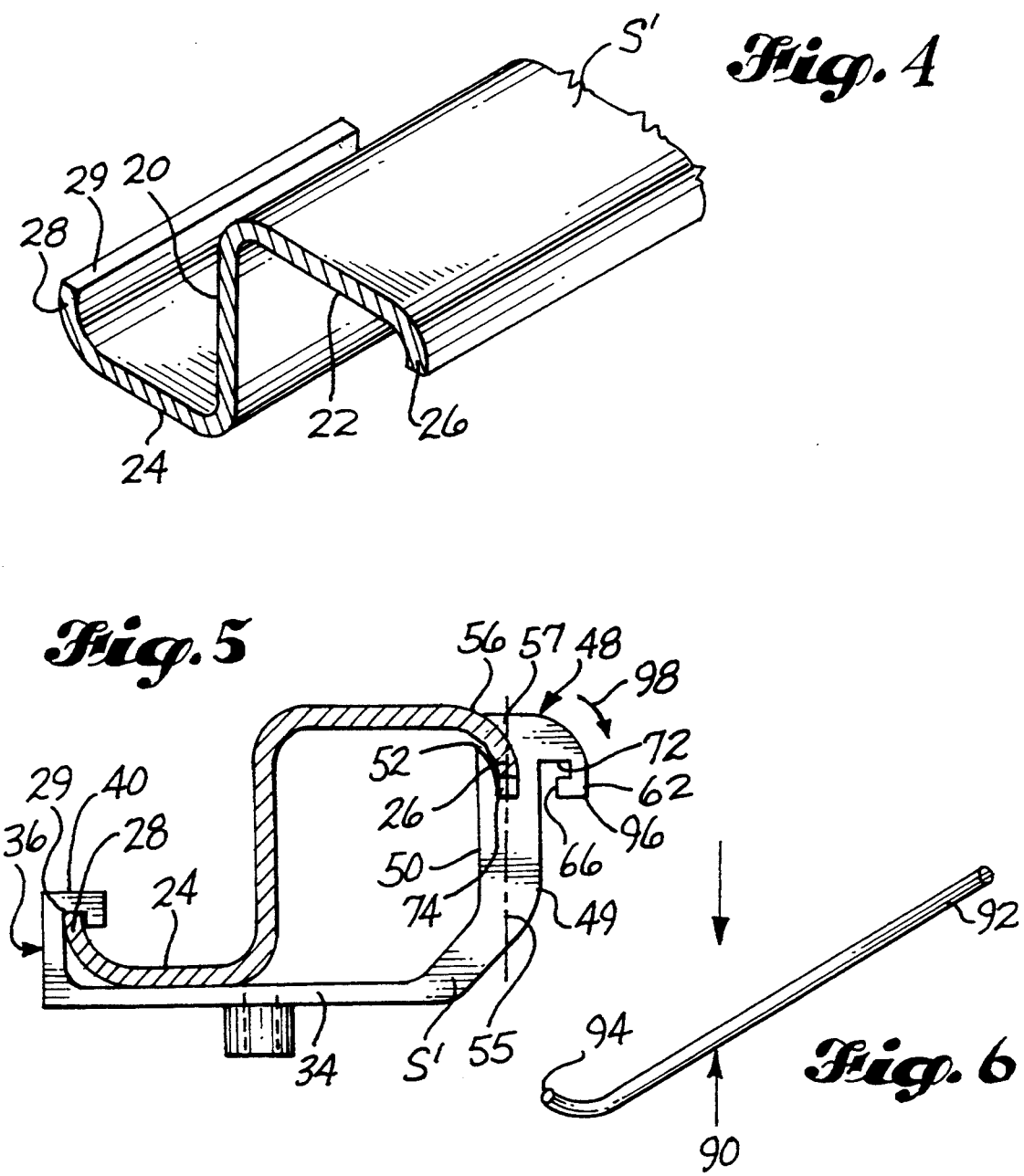

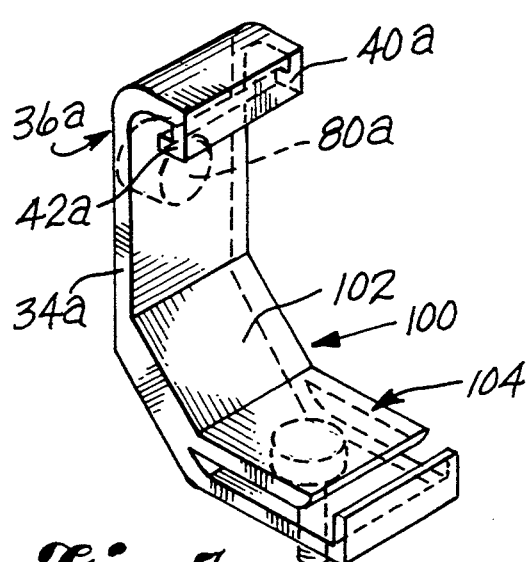
Fig. 7
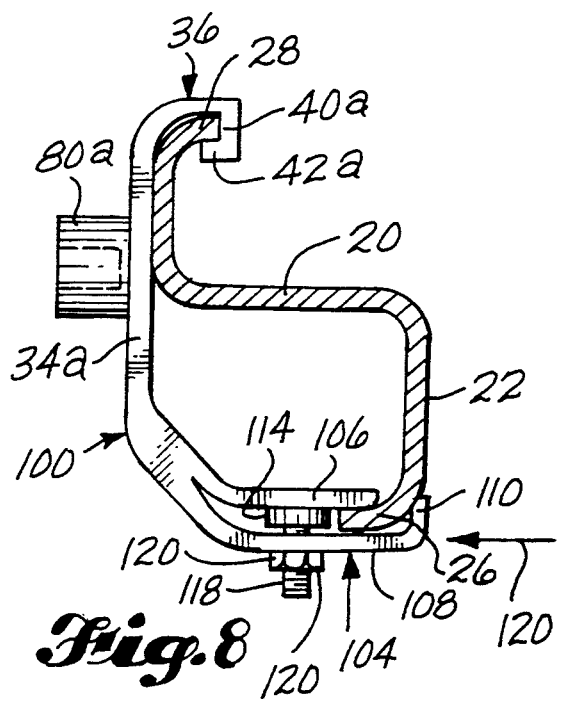
Fig. 8
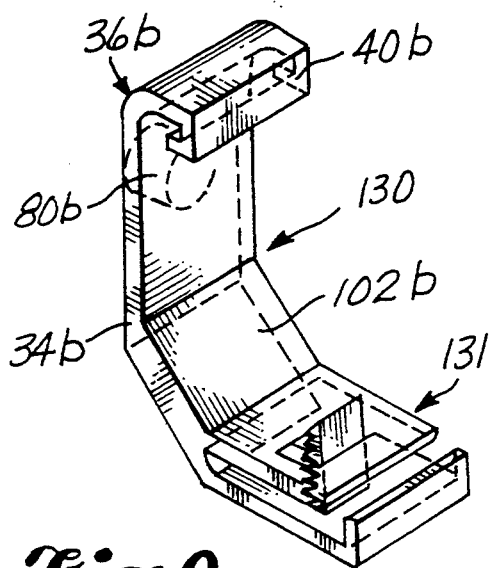
Fig. 9
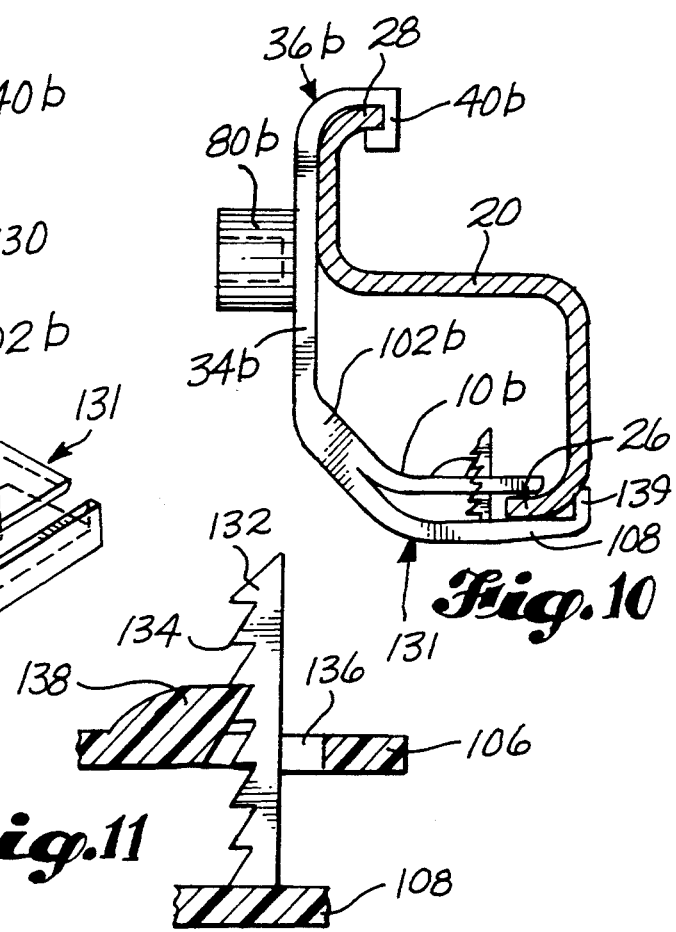
Fig. 10
Fig. 11

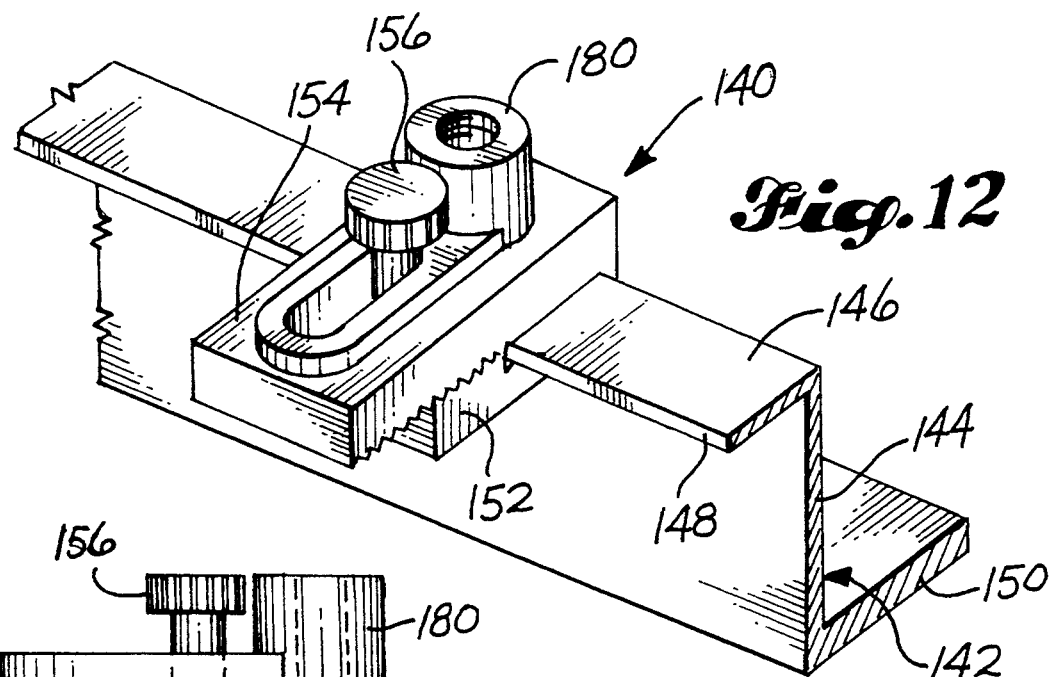
Fig. 12
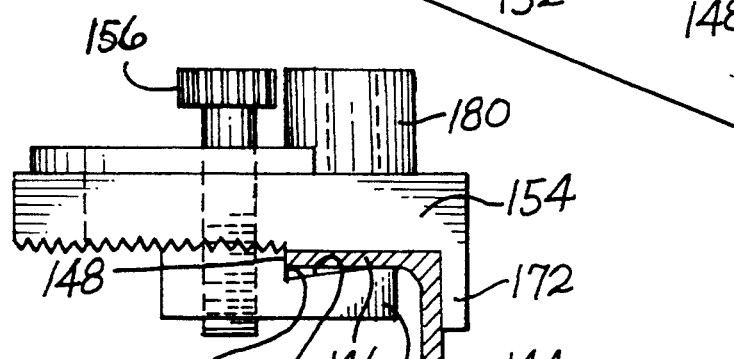
Fig. 13
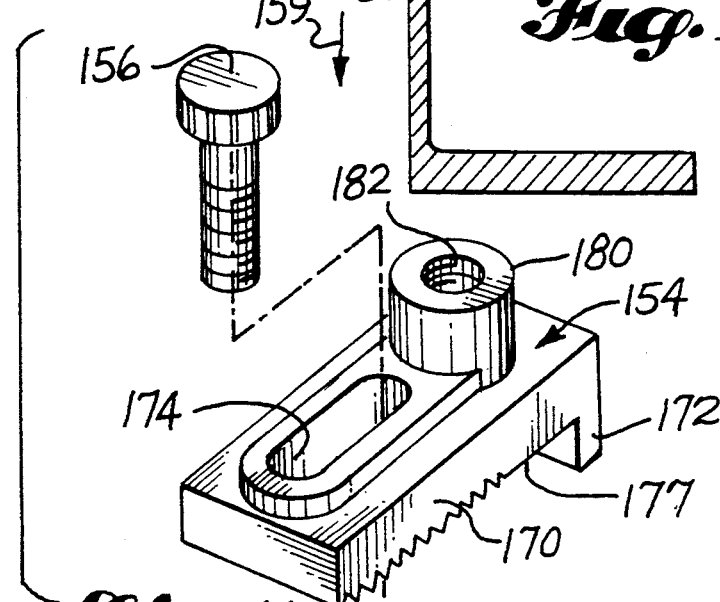
Fig. 14
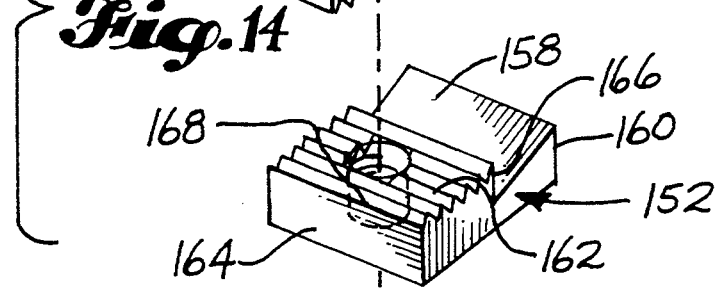

APPARATUS FOR ATTACHING ELEMENTS TO AN AIRPLANE STRINGER

This is a divisional of application Ser. No. 07/825,487 filed Jan. 24, 1992, now abandoned.

TECHNICAL FIELD

The present invention pertains to apparatus for attaching elements to an airplane stringer.

BACKGROUND OF THE INVENTION

An airplane stringer is an longitudinal member in the fuselage, or a spanwise member in the wing, which transmits skin loads into the body frames or wing ribs. That is, an airplane fuselage is formed by a number of crosswise frame members to which are attached a number of lengthwise extending stringers. In turn, the skin of the airplane is fastened to the stringers to form the fuselage.

In addition to supporting the aircraft skin, stringers are used to support various wire bundles, air conditioning conduits, hydraulic lines and the like which extend fore and aft inside the fuselage. Conventionally, the wire bundles, conduits and lines have been attached to the stringers by clips.

Many commercial airplanes have used fuselage stringers which were configured with hat-shaped cross-sections. Some newer model airplanes will be using fuselage stringers which have S-shape cross-sections and others which have Z-shape cross-sections. Because of the change in cross-sectional configuration, the conventional clips which were used to attach the wire bundles and hydraulic lines to the older hat-shaped stringers cannot be used to attach these elements to the S-shape and Z-shape stringers.

A number of conventional clips have been disclosed. For example, U.S. Pat. No. 2,346,200 by Tinnerman discloses a fastening device for a stringer wherein the fastener has two legs which engage opposite sides of the stringer near one of its ends. Furthermore, U.S. Pat. No. 2,329,894 by Hall discloses a wiring fastener which extends around one end of an airplane S-shaped member.

It should be appreciated that a modern jet airliner uses thousands of stringer clips. Therefore it is important that these clips be easy to install. It is also important that once the clips are installed, they remain in place even when subjected to various vibrational and other forces which an airplane typically experiences.

It is therefore an object of the present invention to provide a clip apparatus for attaching various airplane components to stringers.

It is another object to provide a clip apparatus which can be installed simply and quickly.

It is still another object to provide a clip apparatus which remains in place when installed.

SUMMARY OF THE INVENTION

The present invention pertains to apparatus for attaching a first element, such as a wire bundle, conduit or water line, to a second element, such as an airplane stringer. The apparatus includes a base as well as means for grasping the first end of the second element. In addition there are means for attaching the first element to the base. Furthermore, the apparatus includes means for grasping the second end of the second element. This second grasping means includes a slot for receiving the second end therein. The slot is formed by a first wall and a second wall which receive the second end between them. The slot includes an entrance formed by a space between the first wall and the second wall for admitting the second end into the slot. In a further embodiment, the second grasping means includes a lip which is connected to the second wall in a manner to allow entry of the second end into the channel in a first (entry) direction. The lip engages the second end and inhibits removal of this second end from the channel in a second (removal) direction which is opposite to the first (entry) direction.

BRIEF DESCRIPTION OF THE DRAWINGS

The present invention will be described in greater detail in the following Detailed Description in conjunction with the attached drawings, in which:

FIG. 4 is an isometric view of a S-shaped stringer;

FIG. 5 is an side view of the clip shown in FIG. 3 showing the clip attached to an S-shaped stringer;

FIG. 6 is a plan view of a tool for removing the clip shown in FIG. 5 from the stringer;

FIG. 7 is an isometric view of a second embodiment of the clip of the present invention;

FIG. 8 is a side view of the clip shown in FIG. 7 showing the clip attached to an S-shaped stringer;

FIG. 9 is an isometric view of a third embodiment of the clip of the present invention;

FIG 10 is a side view of the clip shown in FIG. 9 showing the clip attached to an S-shaped stringer;

FIG. 11 is a partial section view of the clip shown in FIG. 9;

FIG. 12 is an isometric view of a fourth embodiment of the clip of the present invention showing the clip attached to a Z-shaped stringer;

FIG. 13 a side view of the clip shown in FIG. 12; and

FIG. 14 is an exploded view of the clip shown in FIG. 13.

DETAILED DESCRIPTION

Figure 1:
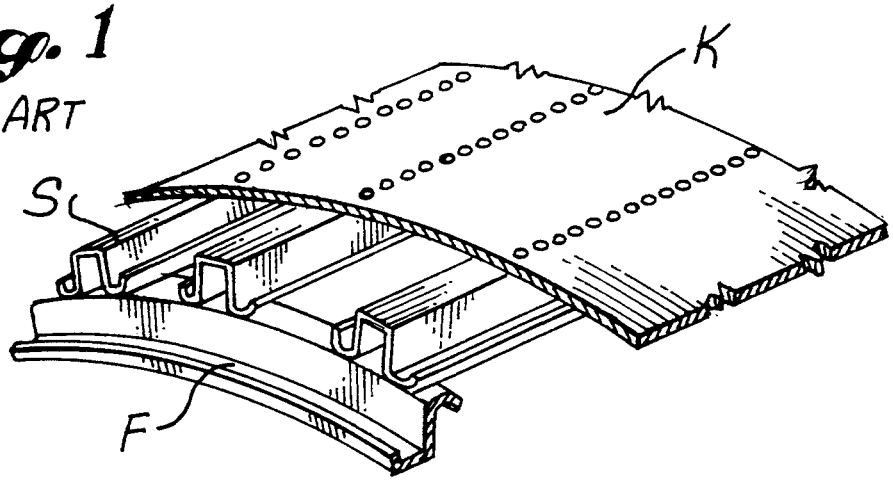
FIG. 1 is an isometric view of a portion of an airplane fuselage showing skin, frames and stringers.
Figure 2:
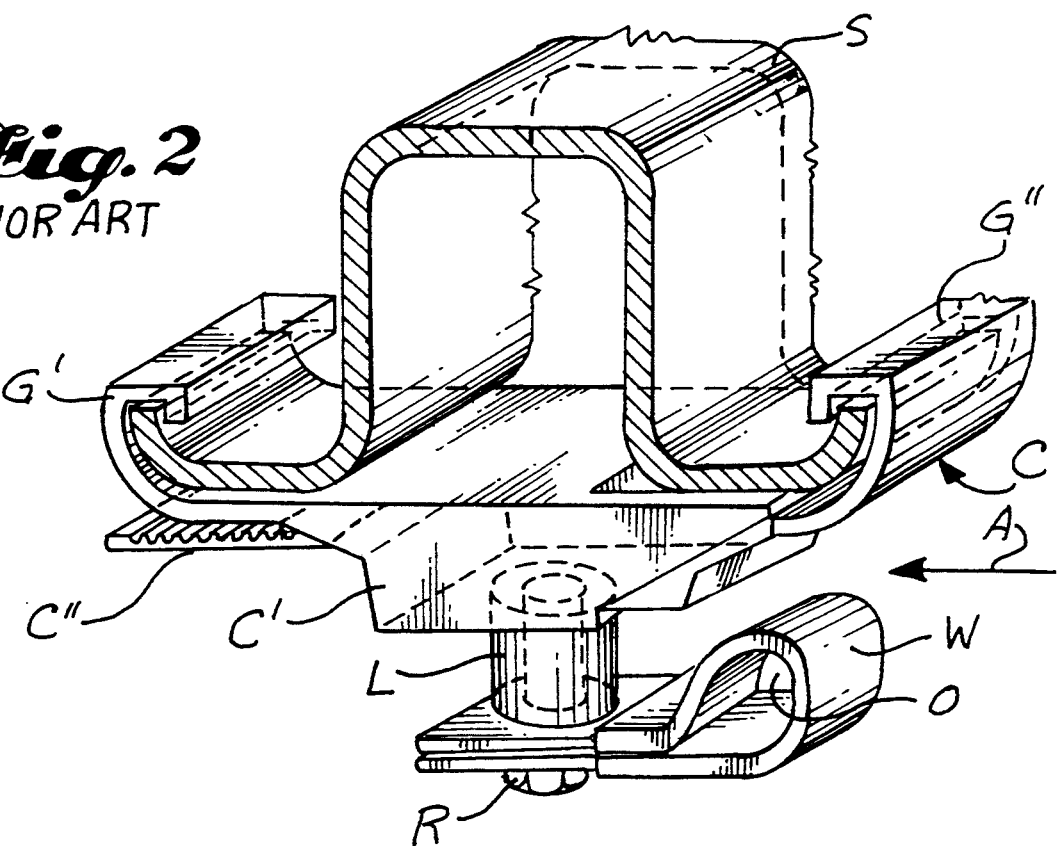
FIG. 2 is an isometric view of a conventional clip for attaching various elements to a conventional hat-shaped stringer.

Referring first to FIG. 1 there is shown a portion of an airplane fuselage skin K which is supported on a conventional "hat-shaped" stringer S, which in turn is connected to a portion of an airplane frame member F. As shown more clearly in FIG. 2, there is connected to the underside of the stringer S a conventional clip indicated at C which includes a lug n to which a wire clamp W is attached by a bolt R. A wire, conduit, or the like (all not shown) is supported within the opening O of the clamp W. The conventional clip C includes a base portion C' with an integral left stringer grasping element G', as well as a unidirectional sliding strap portion C" with an integral right stringer grasping element G". After the left grasping element G' is placed over the left end of the stringer, the sliding strap C" (and the right grasping element G" therewith) is manually slid in the direction of the arrow A so that the right grasping element G" lies against and about the right end of the stringer where it remains in place.

In some of the newer commercial airplanes, the stringers have a somewhat "backward S" configuration as shown in FIG. 4. More specifically, the stringer S' in FIG. 4 (which is not part of the present invention) includes a vertical portion 20 to which at its upper end there is integrally connected a rightward extending horizontal member 22. Furthermore at the lower end of the vertical portion 20 there is integrally connected a leftward extending horizontal member 24. Furthermore, curving downward from the right end of the horizontal member 22 is a right end tip 26 and curving upward from the horizontal member 24 is a left end tip 28 terminating at an upper end surface 29.

Figure 3:
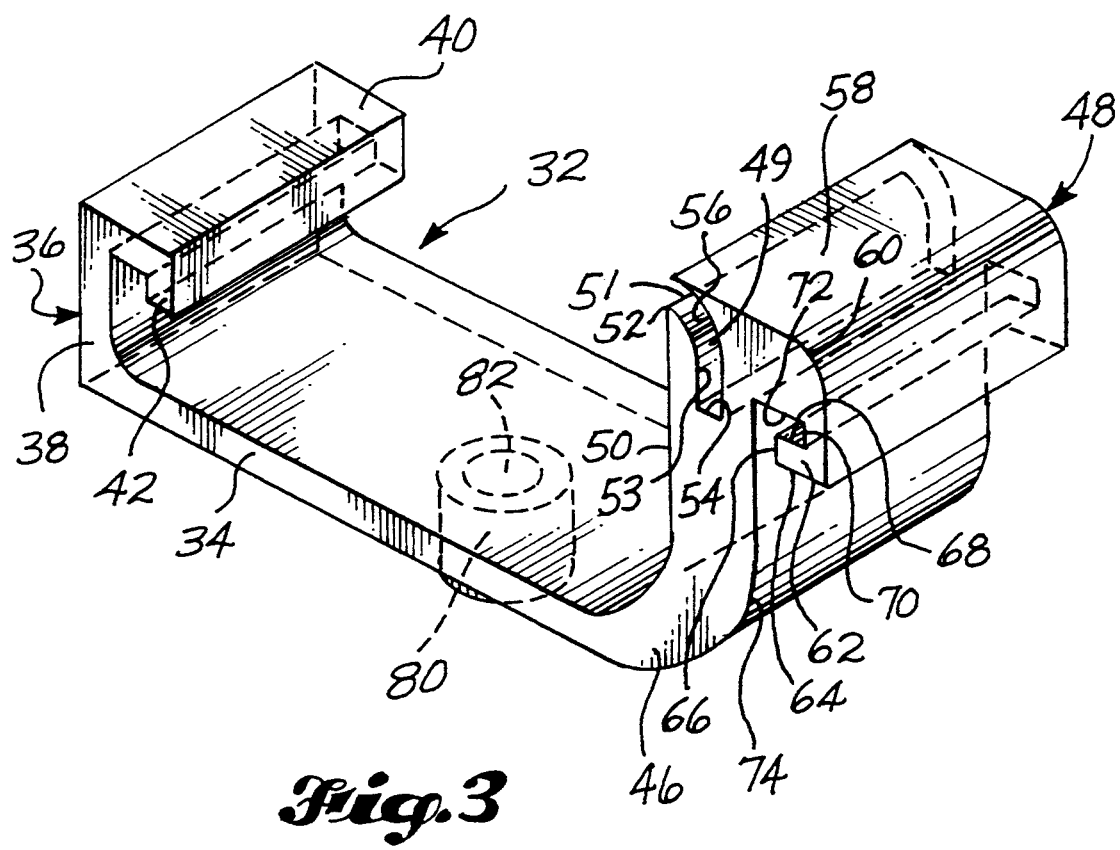
FIG. 3 is an isometric view of an first embodiment of the present invention.

Referring now to FIG. 3, a first embodiment of the present invention includes a clip generally indicated at 32 having a horizontal planar base 34 to which at its left end there is integrally connected an upstanding retaining catch indicated at 36 having somewhat of a "C-shaped" configuration. The left catch includes an upstanding vertical portion 38 to which at its top there is attached a short rightward extending horizontal member 40. Depending a short distance downward from the right end of the horizontal member 40 is a tip member 42.

Still referring to FIG. 3, there is integrally connected to the right end of the base 34 a lower support member 46 which curves upward and rightward from the right end of the base 34. Integrally connected to the top of the support member 46 (about level with the bottom of the left tip 42) is an upstanding retaining catch and "pry-off" portion indicated at 48 having a channel slot 49. The right catch portion 48 includes a left vertical sidewall 50 having at its top end an entrance opening 51 to the channel slot 49. Extending in a curved manner downward and rightward from an upper edge 52 of the entrance opening 51, and then vertically downward parallel to a longitudinal axis 55 (FIG. 5), is a sidewall 53 of the slot 49. At the bottom of the slot, the sidewall 53 joins with a floor 54. The floor 54 extends rightward where it meets a right sidewall 56 which extends vertically upward, and then curves upward and leftward (parallel to the left sidewall 53), terminating at the top of the entrance opening 51. The channel slot 49 has a width which is slightly larger than the width of the right end 26 (FIG. 4) of the channel slot S'.

Referring again to FIG. 3, the catch/pry-off portion 48 further includes a top wall 58 which extends rightward from the top of the entrance opening 51 in a horizontal manner where it meets a sidewall 60 which curves rightward and downward and then vertically downward to form a "pry-off" tip portion 62. The tip 62 includes a leftward extending lip which is formed by a bottom wall 64 which extends leftward from the lowest part of the sidewall 60 approximately level with the floor 54 of the channel 49. The lip is further formed by a left wall 66 extending vertically upward from the left edge of the bottom wall 64 and which joins at its top end with an upper wall 68 which extends in a rightward direction. The right end of the upper wall 68 joins with a sidewall 70 which extends upward where it joins with an upper ceiling wall 72 which extends leftward from the top of the sidewall 70. Furthermore, extending downward from the left end of the ceiling wall 72 is a right sidewall 74 which is parallel to the left sidewall 50 and which joins at its lower end to the lower support member 46.

In addition, the clip 32 includes a cylindrical lug 80 which extends downward from the bottom of base 34. The lug 80 includes a threaded opening 82 for receiving a bolt (not shown) for attaching a wire clamp (such as the clamp W shown in FIG. 2) or other such element to the stringer clip.

In order to attach the stringer clip 32 to the stringer S', the left retaining catch 36 (FIG. 5) is placed over the left end 28 of the stringer such that the upper end surface 29 of the stringer engages a bottom surface of the horizontal portion 40, and the bottom of the stringer portion 24 engages a top surface of the base 34. Following this, the right retaining catch 48 is urged against the stringer S' such that the right end 26 of the stringer is inserted into the channel 49.

In this manner, the clip 32 is held fast to the stringer S'. When experiencing a force against the clip in the direction of the downward pointing arrow (identified by the number 86 in FIG. 5), the clip is held fast at its left end by the left retaining catch 36 and at its right end by the right retaining catch 48. More specifically, at the right side of the clip 32, the sidewall 56 of the retaining catch's channel 49 forms a blocking ledge 57 which prevents removal of the right side of the clip from the stringer.

In order to remove the clip from the stringer, there is provided a removal tool indicated at 90 (FIG. 6) which includes a longer bar portion 92 and a curved hook portion 94 at one end of the bar portion. In the present embodiment, the hook portion 94 is inserted into a receptacle 96 formed by the walls 58, 68, 70 (FIG. 3) so that the tool end portion 94 engages the receptacle lip 62. In this manner, the tool is manipulated so that the catch 48 is caused to move rightward and somewhat downward in the direction shown by the arrow (identified by the number 98 in FIG. 5) thereby moving the blocking ledge 57 out of the way until right end 26 of the stringer is free of the channel slot 49. It should be appreciated, however, that the clip may be easily repositioned along the stringer (without removing the clip) by sliding the clip laterally along the stringer.

In an exemplary embodiment, the clip 32 as well as the other clip embodiments described herein are made from a material which is slightly flexible such as plastic or nylon.

Having described a first embodiment of the present invention, attention now will be turned to FIGS. 7 and 8 where there is shown a second embodiment of the present invention generally indicated at 100. In this second embodiment, like elements described previously will be identified by like numerals with the suffix "a" attached. As shown in these figures, the top portion (or left side in FIGS. 3 through 5) of the clip 100 is identical to the previous embodiment, however the bottom portion of clip 100 is different. More specifically, slanting downward and rightward from the base 34a is a support element 102 which separates at its bottom-end into two elements which are integrally attached to a catch portion indicated at 104. The catch portion 104 includes an upper horizontal grasping flange 106 and a lower grasping flange 108 which is parallel to the upper flange 106. The lower flange 108 extends rightward beyond the end of the upper flange 106 and includes at its right end a short upward extending tip 110.

In order to prevent the upper and lower flanges from being spread apart, extending downward from the bottom surface of the upper flange 106 is a lug 114 which includes an internal vertical channel (not shown) for supporting a threaded bolt 118 therein. The shaft of the bolt 118 extends through a vertical channel (not shown) in the lower flange 108 and is secured by a nut 120 which is attached to the end of the bolt. The nut 120 bears against the lower surface of the flange 108 so that the distance between the lower surface of the upper flange and the upper surface of the lower flange is slightly larger than the thickness of the end portion 26 of the stringer so as to grasp the stringer in an interference fit. Typically, this would be accomplished by tightening nut 120 after the clip had been placed on the stringer. Any dislodging of the lower end of the stringer from the clip in the direction of an arrow identified by the number 120 is resisted by the tip 110.

Turning now to a third embodiment of the present invention shown in FIGS. 9 through 11, like elements described in previous embodiments are identified by like numerals with the suffix "b" attached. The present clip, generally indicated at 130, includes a lower catch 131. That is, extending upward from the top surface of the lower grasping flange 108 is a retaining element 132 (FIG. 11) which has a sawtooth edge 134. The retainer 132 extends upward through a vertical channel 136 in the upper flange 106 where the teeth of the edge 134 engage a tab 138 which extends upward and rightward from the upper surface of the upper flange 106. As shown in FIG. 11, the teeth of the edge 134 are configured such that the upper and lower flanges may be pressed together, but once together they are prevented from moving apart. Typically, the clip is inserted onto the stringer by first installing the upper catch 36b, then the lower catch 131 so that the stringer end 26 is between the upper flange 106 and lower flange 108. Following this, the upper and lower flange arms are pressed together where they remain in place about the stringer end 26 in an interference fit. As further shown in FIG. 10, extending upward from the right end of the lower flange 108 is a tip 139 which serves the same purpose as tip 110 in FIG. 8 and ledge 57 in FIG. 5.

An additional embodiment of the present invention is shown in FIGS. 12 through 14, where like elements described in previous embodiments, are designated by like numerals with the suffix "c" attached. The present clip, generally indicated at 140, is attached to a "backwards Z-shaped" stringer indicated at 142. More specifically, the stringer 142 (which is not part of the present invention) includes a flat vertical middle element 144 to which there is attached at its top end a leftward extending flat horizontal top flange 146 having a left vertical edge 148. Furthermore, extending rightward from the bottom of the middle element 144 is a rightward extending flat horizontal flange 150.

The clip 140 (as best shown in FIG. 14) includes a lower grasping element indicated at 152 which is connected to an upper grasping element indicated at 154 by a bolt 156. More specifically, the lower grasping element 152 includes a right grasping portion 157 (for grasping the stringer in a manner to be discussed later) having an upper surface 158 which slants upward and rightward terminating at a right vertical side edge 160. Furthermore, a left portion of the element 152 (for engaging the upper element 154) includes a horizontal sawtooth upper surface 162 terminating at its left end in a vertical wall 164 and at its right end at a vertical wall 166 which in turn terminates at its lower end at the slanted surface 158. In order to receive the shaft of the bolt 156 therein, the lower element 152 includes a threaded vertical hole 168 extending through the upper sawtooth surface 162.

Still referring to FIG. 14, the upper element 154 has an L-shaped configuration including a horizontal portion 170 to which there is connected at its right end a short downward extending tip 172. In order to receive the shaft of the bolt 156 therethrough, the element 154 includes a racetrack-shaped vertical channel 174. This permits lateral repositioning of the upper element 154 relative to the lower element 152 when installing the clip on the stringer. In order to prevent relative movement between the upper and lower elements once the clip has been installed, a lower surface 176 of the upper element 154 has a sawtooth configuration which engages the sawtooth surface 162 of the lower element when the bolt 156 is tightened down. As further shown in FIG. 14 the upper element 154 includes an upstanding lug 180 having a threaded vertical hole 182 for receiving a bolt therein to secure a clamp (such as clamp W in FIG. 2) or the like to the clip.

Referring now to FIGS. 12 and 13, the clip 140 is installed on the stringer 142 such that a smooth (non-sawtooth) portion 177 of the lower surface of the upper element 154 rests on the upper surface of stringer flange 146 and an inside surface of the tip 172 engages the right surface of the stringer middle element 144. Furthermore, a portion of the slanted upper surface 158 (at the upper end of surface 158) engages the lower surface of the stringer element 146 and the edge 166 of the lower element engages the end surface 148 of the stringer. In this manner, neither leftward nor rightward movement of the clip is permitted. However, by loosening bolt 156 lateral repositioning of the clip along the stringer is permitted.

It should be appreciated that the surface 158 of the the lower element 152 is slanted (rather than being horizontal) to allow for attachment of the clip to stringers having different thicknesses. More specifically, when the clip is attached to a stringer that has relatively large thickness dimension (a larger thickness dimension than the stringer shown in FIG. 13), the grasping portion 157 is caused to flex downward, in a direction shown by the arrow identified by the number 159, to accommodate this larger thickness. It should be further appreciated that the slot 174 permits repositioning of the lower element 152 and upper element 154 relative to each other to accommodate stringers having differing widths of upper flange 146.

What is claimed is:

1. Apparatus for attaching an element to a flange, the apparatus comprising:
   a. top means for engaging the flange which has an upper surface, a lower surface, a left end and a right end, the top means having a horizontal surface and a vertical surface;
   b. bottom means for engaging the flange, the bottom means including an upper horizontal surface and a lower surface and the bottom means including a member having a right end and a left portion which is adjacent to a vertical surface of the bottom means such that the member has a smaller thickness at the left portion than at the right end so that the element is flexible in a vertical direction in order to engage flanges of different sizes between the top means horizontal surface and the bottom means lower surface;
   c. means for connecting the top means to the bottom means about the flange in a manner that (i) the top means horizontal surface engages the flange upper surface, (ii) the top means vertical surface engages the flange fight end, and (iii) the top means horizontal surface and the bottom means lower surface engage the flange between them in an interference fit such that the bottom means lower surface is located below the bottom means upper surface by an amount which allows engagement of the flange between the top means horizontal surface and the bottom means lower surface while the bottom means upper surface engages the top means horizontal surface; and d. means, connected to the top means, for attaching the element to the top means.

2. The apparatus as set forth in claim 1 wherein:

a. the bottom means upper surface and the bottom means lower surface are connected by said vertical surface; and b. the connecting means includes means for connecting the bottom means to the top means such that the bottom means vertical surface engages the left end of the flange and the top means vertical surface engages the right end of the flange.

3. The apparatus as set forth in claim 2 wherein:

a. the bottom means horizontal upper surface is a planar surface; and b. the connecting means includes means for allowing movement of the bottom means upper surface along the top means horizontal surface to reposition the top means vertical surface relative to the bottom means vertical surface.

4. The apparatus as set forth in claim 1 wherein the connecting means includes a fastener which extends through an opening in the top means and which engages the bottom means, the opening being larger than the fastener so as to allow repositioning of the fastener within the opening, the bottom means moving with the fastener relative to the top means to allow repositioning of the bottom means relative to the top means so as to receive flanges of different sizes between the top means vertical surface and the bottom means vertical surface.

5. Apparatus for attaching an element to a flange, the apparatus comprising:

a. top means for engaging the flange which has an upper surface, a lower surface, a left end and a right end, the top means having a first surface with a substantial horizontal alignment component and a second surface with a substantial vertical alignment component;

b. bottom means for engaging the flange, the bottom means including an upper surface having a substantial horizontal alignment component and a lower surface having a substantial horizontal alignment component and the bottom means including a member having a right end and a left portion which is adjacent to a vertical surface of the bottom means such that the member has a smaller thickness at the left portion than at the right end so that the element is flexible in a vertical direction in order to engage flanges of different sizes between the top means horizontal surface and the bottom means lower surface;

c. means for connecting the top means to the bottom means about the flange in a manner that (i) the top means first surface engages the flange upper surface, (ii) the top means second surface engages the flange right end, and (iii) the top means first surface and the bottom means lower surface engage the flange between them in an interference fit such that the bottom means lower surface is located below the bottom means upper surface by an amount which allows engagement of the flange between the top means first surface and the bottom means lower surface while the bottom means upper surface engages the top means first surface; and d. means, connected to the top means, for attaching the element to the top means.

6. Apparatus for attaching an element to a flange, the apparatus comprising:

a. top means for engaging the flange which has an upper surface, a lower surface, a left end and a right end, the top means having a first surface and an upstanding surface having a substantial vertical alignment component;

b. bottom means for grasping the flange, the bottom means including an upper surface and a lower surface and the bottom means including a member having a right end and a left portion which is adjacent to an upstanding surface of the bottom means such that the member has a smaller thickness at the left portion than at the right end so that the element is flexible in a vertical direction in order to engage flanges of different sizes between the top means horizontal surface and the bottom means lower surface;

c. means for connecting the top means to the bottom means about the flange in a manner that (i) the top means first surface engages the flange upper surface, (ii) the top means second surface engages the flange right end, and (iii) the top means first surface and the bottom means lower surface engage the flange between them in an interference fit such that the bottom means lower surface is located below the bottom means upper surface by an amount which allows engagement of the flange between the top means first surface and the bottom means lower surface while the bottom means upper surface engages the top means first surface; and d. means, connected to the top means, for attaching the element to the top means.

7. The apparatus as set forth in claim 6 wherein:

a. the bottom means upper surface and the bottom means lower surface are connected by said upstanding surface having a substantial vertical alignment component; and b. the connecting means includes means for connecting the bottom means to the top means such that the bottom means upstanding surface engages the left end of the flange and the top means upstanding surface engages the right end of the flange.

8. The apparatus as set forth in claim 6 wherein:

a. the bottom means upper surface is a planar surface; and b. the connecting means includes means for allowing movement of the bottom means upper surface along the top means first surface to reposition the top means upstanding surface relative to the bottom means upstanding surface.

9. The apparatus as set forth in claim 6 wherein the connecting means includes a fastener which extends through an opening in the top means and which engages the bottom means, the opening being larger than the fastener so as to allow repositioning of the fastener within the opening, the bottom means moving with the fastener relative to the top means to allow repositioning of the bottom means relative to the top means so as to receive flanges of different sizes between the top means upstanding surface and the bottom means upstanding surface.

* * * * *